May 17, 1938.  A. G. McNICOLL  2,117,768
CLOCK THERMOSTAT
Filed April 1, 1935  3 Sheets-Sheet 1

INVENTOR
Andrew G. McNicoll
BY HIS ATTORNEY
George H. Fisher

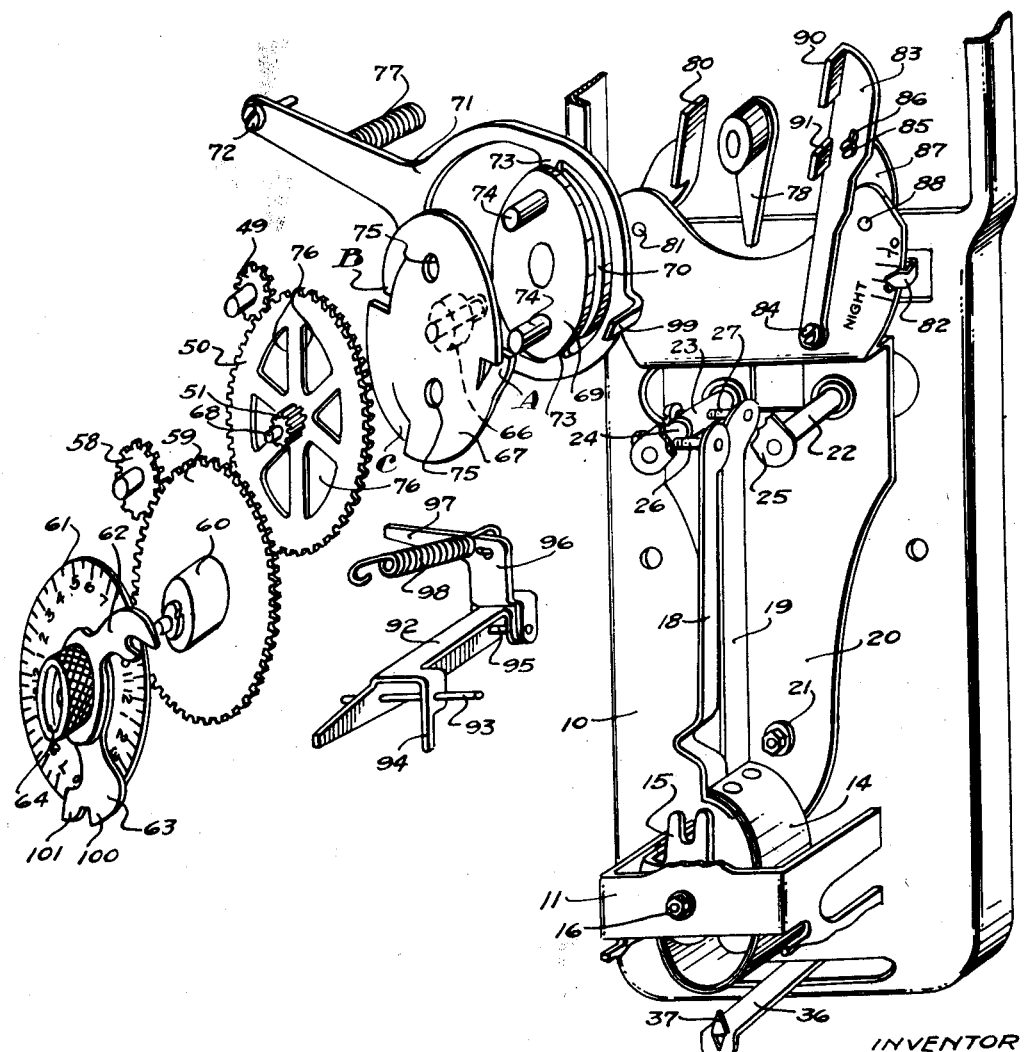

May 17, 1938.  A. G. McNICOLL  2,117,768
CLOCK THERMOSTAT
Filed April 1, 1935  3 Sheets-Sheet 3
Fig. 7
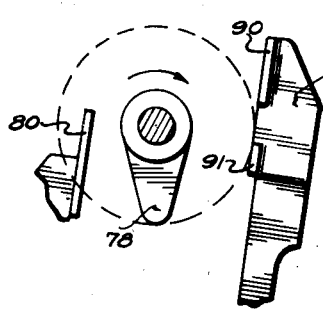
Fig. 8
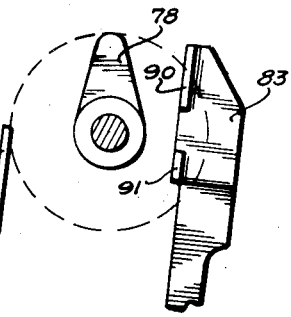
Fig. 9
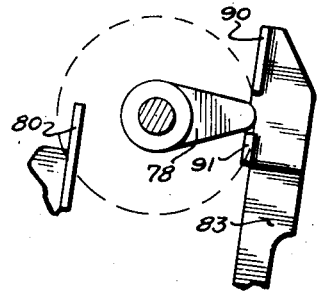
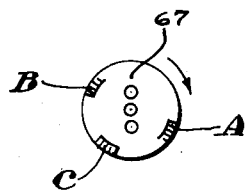
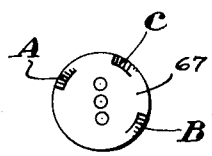
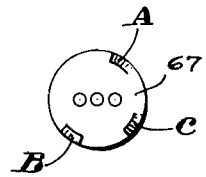
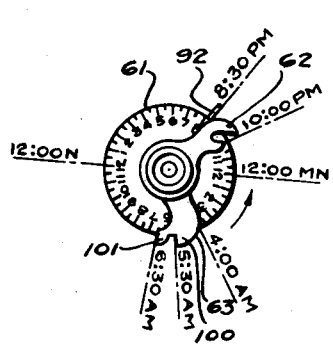
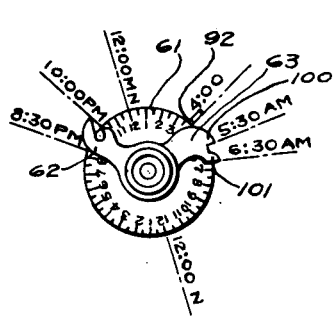
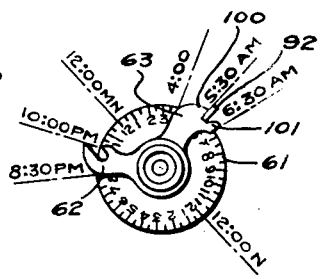
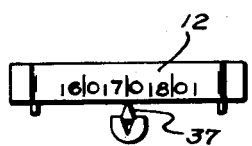
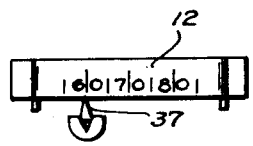
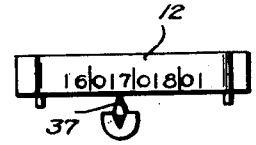
INVENTOR
Andrew G. McNicoll
BY HIS ATTORNEY
George H. Fisher Patented May 17, 1938

2,117,768

UNITED STATES PATENT OFFICE 2,117,768

CLOCK THERMOSTAT

Andrew G. McNicoll, Minneapolis, Minn., assignor to Minneapolis-Honeywell Regulator Company, Minneapolis, Minn., a corporation of Delaware Application April 1, 1935, Serial No. 14,001

13 Claims. (Cl. 200—139)

This invention relates to clock thermostats.

As is known in the art, there is a time lag between the time the heating system is placed in operation and the time at which the room temperature is brought up to the desired level. Because of this time lag, the heating system will deliver heat to the room or space to be heated for some time after the room thermostat has become satisfied. This is especially true during morning pick-up periods under the command of a clock thermostat. Under these conditions, the temperature of the room is low and the temperature of the heating system is low. When the room thermostat is shifted by its clock mechanism from the night setting to the day setting, the heating system will be energized to deliver heat to the room. However, the heating system will build up a surplus of heat and when the room has been brought up to the proper temperature and the heating system shut down, this surplus of heat will be delivered to the room to raise the temperature of the room beyond the desired level, causing what is known in the art as "over-shooting".

Broadly, it is therefore an object of this invention to prevent "over-shooting" of the temperature of the room during morning pick-up.

This is accomplished in applicant's invention by providing a two-stage morning pick-up whereby the thermostat setting is raised to an intermediate point for a predetermined length of time to permit the heating system to expend its surplus heat during this predetermined time at this intermediate temperature level. The heat so expended by the system is usually sufficient to bring the room temperature up to normal. If this surplus of heat delivered to the room is not sufficient to bring the temperature of the room up to normal, then a subsequent operation of the clock thermostat causes energization of the heating system to bring the room temperature up to normal. In other words, this invention permits the use of the surplus of heat in the heating system for bringing the room or space to be heated up to the desired temperature and to prevent this surplus of heat from causing "over-shooting".

More specifically, it is an object of this invention to combine a time means with an adjustable thermostat for adjusting the setting of the thermostat by lowering the setting of the thermostat at night and for raising partially the setting of the thermostat at one time in the morning and for raising completely the setting of the thermostat at a subsequent time in the morning.

Another object is to provide a time mechanism for adjusting the setting of a thermostat which time mechanism includes means for adjusting the thermostat in one direction in a single step and in the other direction in a plurality of steps.

Still more specifically, it is an object of this invention to provide in combination with an adjustable thermostat, a constantly driven shaft, cam means driven by the shaft, adjusting means for the thermostat, clutch means between the shaft and the adjusting means, and means actuated by the cam means for controlling the clutching means to adjust the thermostat in one direction at a predetermined time, to adjust partially the thermostat in the other direction at another predetermined time, and to adjust completely the thermostat in the second direction at still another predetermined time.

Another object is to provide manual means for adjusting the setting of a clock thermostat of the type specified above wherein the automatic setting means in no way interferes with the manual adjusting means.

Other objects and advantages will become apparent to those skilled in the art by reference to the accompanying specification, claims and drawings in which:

Fig. 5 is a rear elevational view of a portion of the control mechanism of this invention with parts broken away for purposes of clearness.

Fig. 6 is an exploded perspective view of the fundamental parts of my clock thermostat to clearly show the features of this invention.

Figs. 7, 8 and 9 are diagrammatic views showing various parts of the clock thermostat in their relative positions for various adjustments.

Figures 1, 2, 3, 4:
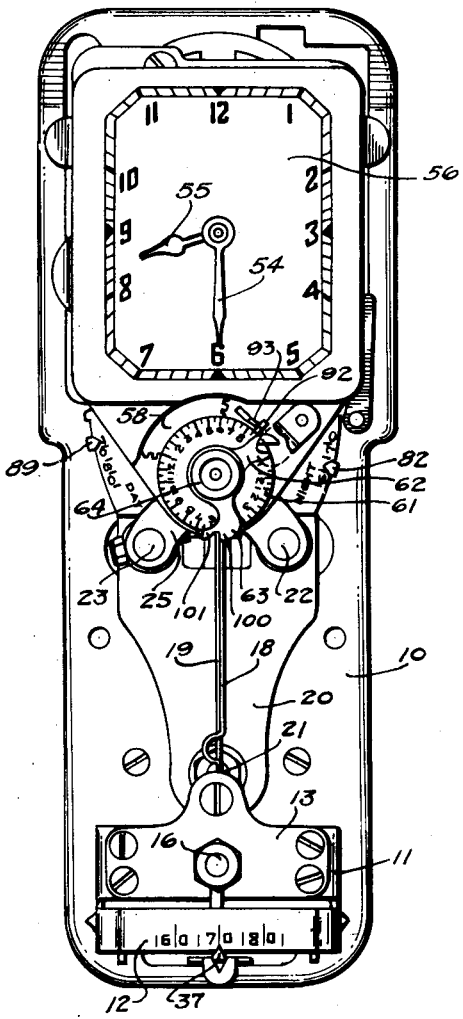
Fig. 1 is a front elevational view of the clock thermostat of my invention with the cover thereof removed.
Fig. 2 is an irregular vertical sectional view through the clock thermostat looking from the right in Fig. 1.
Fig. 3 is a vertical sectional view drawn to an enlarged scale of a portion of the control mechanism of my invention.
Fig. 4 is a plan view of the structure shown in Fig. 3 with certain parts shown in section for purposes of clearness.

This invention is an improvement over my copending application S. N. 595,460, filed February 27th, 1932 and to fully disclose the features of this invention some of the structure in that application will be briefly referred to herein. The clock thermostat proper is assembled on a base 10. Extending forwardly from the bottom of the base 10 is a bracket 11 upon which are located temperature indications 12. The bracket 11 carries an insulating member 13 to which is pivoted a bracket 15 by means of a combined screw and binding post 16. The bracket is adjustably positioned with respect to the insulation 13 of the bracket 12 by means of an eccentric adjusting screw 17 working in a slot in the bracket 15. Rigidly secured to the bracket 15 is a thermostatic element 14 and rigidly connected to the thermostatic element 14 are switch arms 18 and 19.

Pivotally mounted on the front of the base 10 by means of a pivot 21 is a plate 20. This plate 20 carries binding posts 22 and 23, the binding post 23 having a portion 24 insulated therefrom. The insulated portion 24 is electrically connected with the post 22 by means of a bridge 25. Adjustable contacts 26 and 27 are carried by the post 23 and the insulated portion 24. Wires connect the binding post 16, the post 23 and the post 22 to a terminal block 28 located on the rear of base 10.

The operation and construction of the thermostatic switch disclosed above is identical to that of the thermostatic switch disclosed in my copending application and a further description is not considered necessary it being sufficient to state that upon a decrease in temperature as affecting the thermostatic element 14, the switch arms 18 and 19 will be moved sequentially into engagement with contacts 26 and 27 respectively to complete electrical circuits as described in my copending application. Upon an increase in temperature, the switch arms 18 and 19 will be moved out of engagement with the contacts 26 and 27 by the thermostatic element 14 to break the electrical circuits.

The plate 20 has a pronged portion 30 punched rearwardly therefrom and located between the prongs of this portion is a pin 31 carried by a crank 32. The crank 32 is rigidly secured to a rod 33 which is suitably journalled in the base 10 as at 34 and 35. Mounted against rotation on the lower end of the rod 33 is a lever 36 having a pointer 37 thereon to cooperate with the temperature indications 12 on the bracket 11.

By moving the lever 36, the plate 20 is moved about its pivot 21 by the above described structure to move the contacts 26 and 27 toward or away from the switch arms 18 and 19. When the lever 36 is moved to the right of the position shown in Fig. 1, the contacts 26 and 27 are moved toward the switch arms 18 and 19 to increase the temperature setting of the thermostat. Moving the lever 36 toward the left from the position shown in Fig. 1, the contacts 26 and 27 are moved away from the switch arms 18 and 19 to lower the temperature setting of the thermostat.

The electric clock mechanism is secured to spaced plates 40 and 41, the plates being held in spaced relation by means of spacers 42. The clock mechanism is removably secured to the base 10 in the manner pointed out in my copending application. Mounted between the plates 40 and 41 is a synchronous motor 43 which drives a motor pinion 44. A fibre gear 45 mounted upon a shaft 46 meshes with the motor pinion 44. The other end of the shaft 46 carries a pinion 47 which is in mesh with a gear 48. The gear 48 has integrally secured therewith a pinion 49 which meshes with a gear 50. The gear 50 is rigidly secured to pinion 51 which in turn meshes with gear 52. The gear 52 is mounted on a shaft which passes through the plate 41 into a casing 53 for operating a further gear reduction mechanism therein. The gear reduction mechanism within the casing 53 in turn operates the minute and hour hands 54 and 55 respectively which hands cooperate with time indications located on the clock face 56.

The gear train within the casing 53 also operates a gear 57 which has secured for rotation therewith a pinion 58 which meshes with a gear 59. The gear 59 is rigidly secured to a shaft 60. By reason of the above described gear reduction train, the shaft 60 is driven in such a manner that it makes one complete revolution during every twenty-four hours. Secured to the twenty-four hour shaft 60 is a dial disc 61. Adjustably mounted on the shaft 60 are cam levers 62 and 63 which are held in fixed position after adjustment by means of a knurled nut 64. The cam lever 62 has a cam surface which projects beyond the periphery of dial disc 61 and the cam lever 63 has two cam surfaces 100 and 101 projecting beyond the periphery of the dial disc 61 for a purpose to be pointed out more fully hereafter.

Mounted between the spaced plates 40 and 41 is a third plate 65. Referring to Figs. 2 and 3, the plate 65 has an opening therein in which is mounted for rotation a sleeve 66. Integrally formed with the outer end of the sleeve 66 is a cam disc 67. The pinion gear 51 is formed with an integral shaft 68 which is journalled at one end in the plate 41 and at the other end in the sleeve 66. The gear 50 is rigidly secured to the gear 51 for rotation therewith. Mounted for rotation on the sleeve 66 is a clutch collar 69, having annular groove 70 located in the periphery thereof. Loosely mounted on the plate 65 by means of a screw 72 is a lever 71, having tongues 73 adapted to ride in the groove 70 of the clutch collar 69. Mounted in the clutch collar 69 are forwardly extending pins 74 which are adapted to extend through holes 75 in the cam disc 67 and when the clutch collar is moved into engagement with the cam disc 67, the pins 74 are adapted to project forwardly into openings 76 in the gear 50. A spring 77, shown to be a coil spring in Fig. 6 for purposes of illustration, is located between the plate 65 and the lever 71 normally to urge the clutch collar 69 to its forward position to cause the pins 74 to register with the opening 76 of the gear 50. Mounted on the sleeve 66 on the opposite side of plate 65 by means of a screw 79 is a cam 78 so that when the pins 74 extend into the opening 76 of the gear 50 the cam 78 will be moved by the gear 50.

The cam disc 67 is provided with three cam surfaces, A, B and C which are adapted to engage a prong 99 on the lever 71 to move the lever 71 rearwardly against the action of the spring 77. Such rearward movement causes the pins 74 of the clutch collar 69 to disengage from the openings 76 in the gear 50 whereby rotational movement of the cam disc 67 and the cam 78 is prevented. When the cam surfaces A, B or C are moved out of engagement with the prong 99 of the lever 71, the spring 77 causes the pins 74 to enter the openings 76 of the gear 50 to impart rotational movement to cam disc 67 and the cam 78.

A night abutment member 80 is pivotally mounted by means of pin 81 to the upper extremity of the plate 20. The abutment 80 is adjusted about its pivot by means of pointer 82 extending across the plate 20 and the amount of adjustment is visually indicated by the coaction of the pointer 82 with suitable night indications located on the plate 20. A morning pick-up or day abutment member 83 is pivoted to the plate 20 by means of a screw 84. The abutment member 83 is adjustably positioned by means of a pin 85 working in a slot 86 in the abutment member 83. The pin 85 is secured to the lever 87 which is pivoted to the plate 20 as at 88. The lever 87 extends across the plate 20 and is provided with a pointer 89 which coacts with suitable day indications on the plate 20 to determine the adjusted position of the day abutment member 83. The abutment member 83 is provided with two spaced portions 90 and 91. The abutment member 80 and the spaced portions 90 and 91 are adapted under predetermined conditions to be engaged by the cam 78 to move the plate 20 and consequently change the setting of the thermostat as pointed out above.

Extending through and pivotally mounted to the plate 41 by means of a pin 93 is an actuating lever 92. Extending downwardly from the actuating lever 92 is an abutment 94 which engages the front surface of the plate 41 to limit downward movement of the forward end of the lever 92. Pivotally mounted to the rear end of lever 92 by means of a pivot pin 95 is an upwardly extending member 96 which has an inwardly extending projection 97 which is adapted to ride against the rear face of the cam disc 67. The member 96 is held against the rear surface of cam disc 67 and in an upper position by means of spring 98 secured to the plate 41. The lug 99 of the lever 71 is located in a plane immediately below the plane occupied by the portion 97 of the member 96.

Assume the parts in the positions shown in Figs. 1 and 7, counter-clockwise movement of the dial disc 61 will cause the lever 92 to ride up the cam surface of the cam lever 62 to cause clockwise movement of lever 92 as viewed in Fig. 2 and consequent downward movement of the portion 97 of the member 96 pivotally secured to the lever 92. This down movement of the member 96 causes clockwise rotation of the cam disc 67 and consequent movement of the cam surface A out of engagement with the prong 99 of the lever 71. This movement also causes the portion 97 of the member 96 to move between the cam disc 67 and the prong 99 of the lever 71. Upon a slight further movement of dial disc 61, the cam lever 62 will be moved out from underneath lever 92 and lever 92 will be moved in a counter-clockwise direction as viewed in Fig. 2 by means of the spring 98. Such counter-clockwise movement causes the portion 97 of the member 96 to move upwardly from between the cam disc 67 and prong 99. The prong 99 will then be forced against the rear surface of the cam disc 67 by the spring 77. Such movement causes the pins 74 of the clutch collar 69 to enter the openings 76 of the gear 50 to clutch the gear 50 with cam disc 67. Rotation of the gear 50 will then cause rotation of the cam disc 67 and the cam 78. The cam 78 will then engage the abutment member 80 to alter the setting of the thermostat from a high temperature setting to a low temperature setting. Rotation of cam disc 67 will continue until the next cam surface comes into engagement with the prong 99 of the lever 71. Upon such engagement, the lever 71 is moved rearwardly by the prong riding up the cam surface B. This will cause removal of pins 74 from the openings 76 with a consequent declutching action whereby further rotation of the cam disc 67 and the cam 78 is prevented. The cam 78 and the cam disc 67 will remain in this new position until the cam lever 63 of the dial disc 61 engages the lever 92 to cause another cycle of operation similar to that outlined immediately above. This general mode of operation is fully disclosed in my copending application and a further description is not here considered necessary.

As pointed out above, the day abutment member or the morning pick-up member 83 is provided with two abutment surfaces 90 and 91, that the cam disc 67 is provided with three cam surfaces A, B and C and that the cam lever 62 is provided with two cam surfaces 100 and 101. It should be noted at this point that the abutment portions 90 and 91 are spaced apart, that the cam surfaces A and B are spaced substantially 180° apart and that the cam surface C is spaced substantially 90° away from cam surfaces A and B. It should also be noted at this point that the cam surfaces 100 and 101 of the cam lever 63 are spaced apart by a time interval of one hour.

For purposes of illustration, the cam lever 62 is so positioned as to cause a lowering of the thermostat setting at 10:00 P. M. and the cam lever 63 is so positioned as to cause the first stage of pick up at 5:30 A. M. and the second stage of pick up at 6:30 A. M.

Assume the parts in the position shown by Figs. 1 to 7 of the drawings. The cam 78 is pointing downwardly, the cam surface A of cam disc 67 is holding the control mechanism in a declutched position, the lever 92 is about to ride up the surface of cam lever 62 and the thermostat is set for 70°. The time of the day set out by these positions is substantially 8:30 P. M. As the electric clock keeps running, the lever 92 rides up the cam surface of the cam lever 62 conditioning the control mechanism until the time of 10:00 P. M. is established. At 10:00 P. M., the lever 92 falls off of the cam surface 62 which causes clutching of the control mechanism in the manner pointed out above. Such clutching causes clockwise movement of the cam disc 67 and the cam 78. This clockwise movement of the cam 78 causes the cam to engage the night abutment member 80 to shift the same to the position shown in Fig. 8. Movement of the cam 78 and the cam disc 67 will continue until substantially 180° travel thereof has been completed at which time cam surface B of cam disc 67 engages the prong 99 of the lever 71 to declutch the control mechanism in the manner pointed out above. Movement of the night abutment member 80 by the cam 78 to the position shown in Fig. 8 causes lowering of the setting of the thermostat from 70° to 60° as shown in Fig. 8.

The thermostat will remain at the 60° setting until the cam surface 100 of the cam lever 63 comes into operation. At 4:00 A. M., the lever 92 will ride up the cam surface 100 of cam lever 63 to condition the clutching mechanism for operation in the manner pointed out above. At 5:30 A. M., the lever 92 will fall off of the cam surface 100 and cause clutching action of the control mechanism in the manner pointed out above. When the clutching action has been established, cam 78 and the cam disc 67 will be rotated in a further clockwise direction and cam 78 will engage the upper abutment surface 90 to cause movement of the day abutment member 83 to the right to the position shown in Fig. 9 and consequent changing of the setting of the thermostat from 60° to 67°. Since the cam surface C is spaced only 90° from cam surface B, the control mechanism will be declutched after 90° of rotation of cam disc 67 and cam 78 in the manner pointed out above. The parts will then rest in the positions shown in Fig. 9 with the thermostat setting at 67°.

Upon further rotation of the dial disc 61, the lever 92 will be caused to ride up the cam surface 101 and such movement will cause presetting or conditioning of the clutching mechanism in the manner described above. At 6:30 A. M., the lever 92 will ride off the cam surface 101 of cam lever 69 to cause a clutching action and consequent rotation of the cam 78 and cam 67 in a clockwise direction. Rotation of cam 78 in this clockwise direction causes further right hand movement of the day abutment member 88 to shift the setting of the thermostat from 67° as shown in Fig. 9 to 70° as shown in Fig. 7. Since the cam disc A is spaced only 90° from the cam disc C only 90° of clockwise movement of the cam disc 67 and the cam 78 from the position shown in Fig. 9 will be permitted. After completion of this second stage of morning pick-up, the parts will be positioned for regular day operation and will assume the position shown in Fig. 7. The parts will remain in the position shown in Fig. 7 and the temperature setting of 70° will be maintained until the cam lever 62 coacts with the lever 92 to cause night shut down at substantially 10:00 P. M. as pointed out above.

From the above it is seen that I have provided an automatic setting device for a thermostat which lowers the setting at night and which causes a two stage pick-up or a two stage raising of the setting of the thermostat in the morning whereby overshooting of the heating system is largely prevented. By relatively positioning the cam levers 62 and 69 with respect to the dial disc 61, the time of the night lowering and the two stage morning pick-up may be varied at will.

Although I have disclosed a two stage morning pick-up, it is within the contemplation of this invention to include any number of stages. This may be accomplished by increasing the number of abutment surfaces on the day abutment member 88, the number of cam surfaces between the present cam surfaces A and B, and the number of cam surfaces on the cam lever 69.

As a further feature of this invention, it will be noted that no matter what positions the time controlled thermostat setting means may occupy, the thermostat may be manually adjusted by manipulation of the pointer 87. If the parts are in the positions shown in Fig. 7 and 8, the cam 78 is vertically arranged to permit lateral movement of the abutment members 80 and 88 whereby the thermostat may be set in any position by manual operation of the pointer 87. Also, if the parts are in the position shown by Fig. 9, the cam 78 is adapted to enter the space between the abutment portions 90 and 91 to permit lateral movement of the abutment members 80 and 88. No binding action, whatsoever, occurs to prevent free and easy manual manipulation whether the time setting mechanism be positioned for day operation, night operation or morning pick-up operation.

Although I have disclosed one specific embodiment of this invention, my invention should not be limited thereby but should be limited only by the scope of the appended claims and the prior art.

I claim as my invention:

1. In combination with an adjustable thermostat, time means for adjusting the setting of the thermostat at predetermined times including cam means for lowering the setting of the thermostat in one step and cam means for raising the setting of the thermostat in a plurality of steps, and means for manually adjusting the thermostat at will at all times.

2. In combination with an adjustable thermostat, automatic means driven at a constant speed for adjusting the setting of the thermostat at predetermined times including cam means for adjusting the thermostat in one direction in a single step and cam means for adjusting the thermostat in the opposite direction in a plurality of steps.

3. In combination with an adjustable thermostat, automatic means driven at a constant speed for adjusting the setting of the thermostat at predetermined times including cam means for adjusting the thermostat in one direction in a single step and cam means for adjusting the thermostat in the opposite direction in a plurality of steps, and means for manually adjusting the setting of the thermostat irrespective of the automatic means.

4. In combination with an adjustable thermostat, a constantly driven means, operating means driven by said constantly driven means, adjusting means for said thermostat, motion transmitting means between said constantly driven means and said adjusting means, and means actuated at predetermined times by said operating means to control said motion transmitting means to lower the setting of said thermostat in a single step and to raise the setting of the thermostat in a plurality of steps.

5. In combination with an adjustable thermostat, a constantly driven means, operating means driven by said constantly driven means, adjusting means for said thermostat, motion transmitting means between said constantly driven means, said adjusting means, and means actuated at predetermined times by said operating means to control said motion transmitting means to lower the setting of said thermostat in a single step and to raise the setting of the thermostat in a plurality of steps, and manual means for adjusting the thermostat at will regardless of the position of said adjusting means.

6. In combination with an adjustable thermostat, a constantly driven shaft, cam means driven by said shaft, adjusting means for the thermostat, clutch means between said shaft and said adjusting means, and means actuated by said cam means for controlling said clutch means to adjust the thermostat in one direction at a predetermined time, to adjust partially the thermostat in the other direction at another predetermined time and to adjust completely the thermostat in the second direction at another predetermined time.

7. In combination with an adjustable thermostat, a constantly driven shaft, cam means driven by said shaft, adjusting means for the thermostat, clutch means between said shaft and said adjusting means, and means actuated by said cam means for controlling said clutch means to lower the setting of the thermostat at a predetermined time, to rise partially the setting of the thermostat at another predetermined time and to raise completely the setting of the thermostat at another predetermined time.

8. In a device of the class described, a constantly driven shaft, cam means driven by said shaft, actuating means for performing a function, clutch means between said shaft and said actuating means, declutching means operated by said actuating means, and a mechanism associated with said declutching means and operated by said cam means to cause operation of said actuating means through a plurality of steps, the first step being greater than the remaining steps.

9. In combination, a clock, means constantly driven by the clock, a thermostat, adjusting means therefor including a normally stationary cam, a clutch for intermittently connecting said cam to the first mentioned means for operation thereby, a member constantly driven by said clock, cams mounted on said member for actuating said clutch to cause the thermostat to be set to a lower temperature in one step at night and to cause the thermostat to be set to a higher temperature in two separate steps in the morning.

10. In combination, a timer, means constantly driven by said timer, a thermostat, adjusting means therefor including a normally stationary cam, a clutch for intermittently connecting said cam to the first mentioned means for operation thereby, a member constantly driven by said timer, cams mounted on said member for actuating said clutch to cause the thermostat to be set to a lower temperature in one step at one time and to cause the thermostat to be set to a higher temperature in separate steps at another time, and means for manually adjusting the thermostat at will at all times.

11. In combination, a clock, means constantly driven by the clock, a thermostat, adjusting means therefor including a normally stationary cam, a clutch for intermittenetly connecting said cam to the first mentioned means for operation thereby, a member constantly driven by said clock, cams mounted on said member for actuating said clutch to cause the thermostat to be set to a lower temperature in one step at night and to cause the thermostat to be set to a higher temperature in two separate steps in the morning, and means for manually adjusting the thermostat in either direction when the thermostat is in its high setting.

12. In combination, a clock, means constantly driven by the clock, a thermostat, adjusting means therefor including a normally stationary cam, a clutch for intermittently connecting said cam to the first mentioned means for operation thereby, a member constantly driven by said clock, cams mounted on said member for actuating said clutch to cause the thermostat to be set to a lower temperature in one step at night and to cause the thermostat to be set to a higher temperature in separate steps in the morning, and means for predetermining the high and low settings.

13. In combination, a clock, means constantly driven by the clock, a thermostat, adjusting means therefor including a normally stationary cam, a clutch for intermittently connecting said cam to the first mentioned means for operation thereby, a member constantly driven by said clock, cams mounted on said member for actuating said clutch to cause the thermostat to be set to a lower temperature in one step at night and to cause the thermostat to be set to a higher temperature in two separate steps in the morning, and means for individually adjusting each of the high and low settings.

ANDREW G. McNICOLL.